May 6, 1924.
L. H. STARNES
1,493,291
CHILD'S VEHICLE
Filed Oct. 14 1922   3 Sheets-Sheet 1
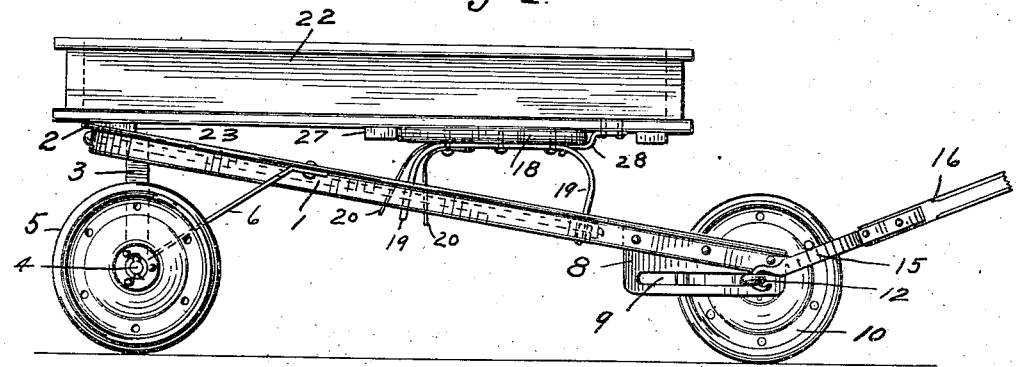
Fig. 1.
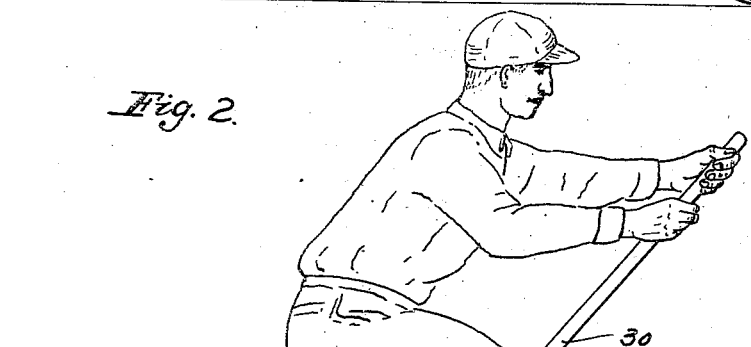
Fig. 2.
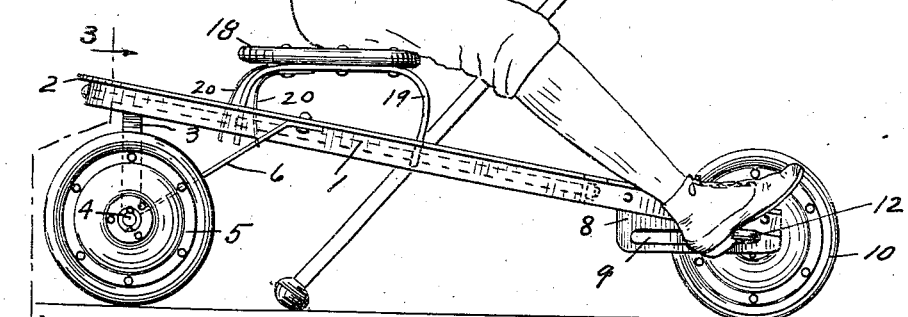
Fig. 3.
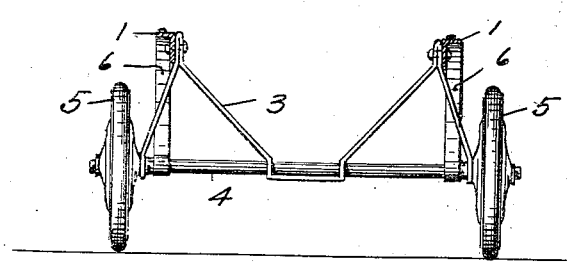
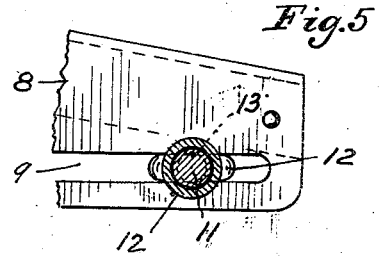
Fig. 5
Inventor
LEWIS H. STARNES
By his Attorney
James F. Williamson May 6, 1924.
L. H. STARNES
CHILD'S VEHICLE
Filed Oct. 14, 1922
1,493,291
3 Sheets-Sheet 2
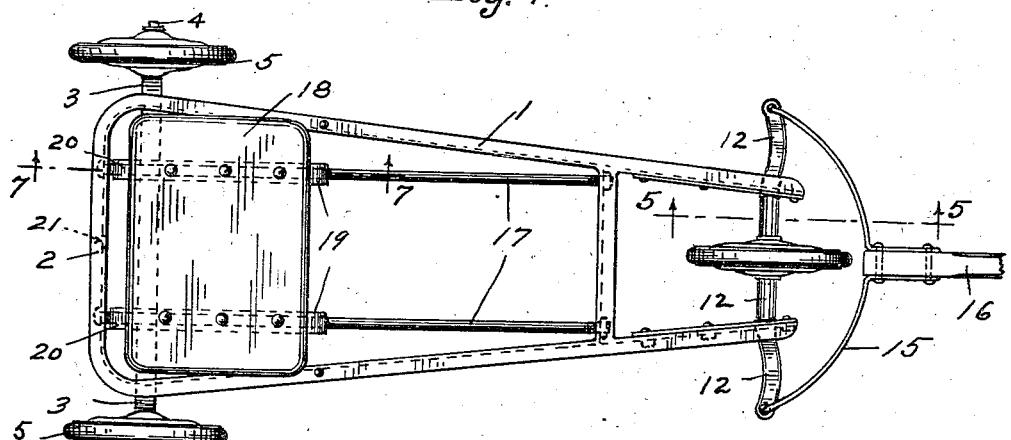
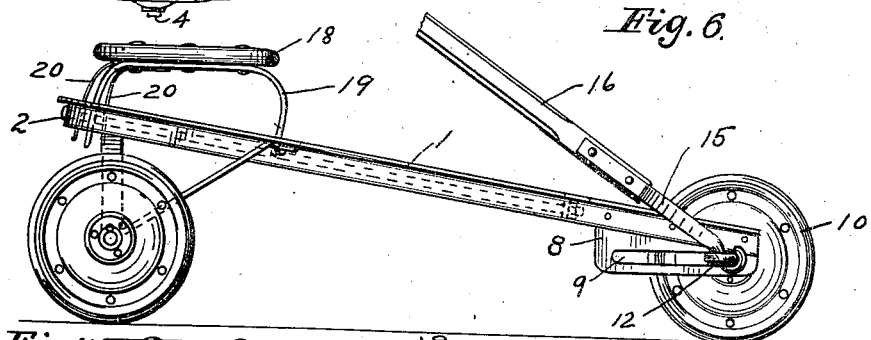
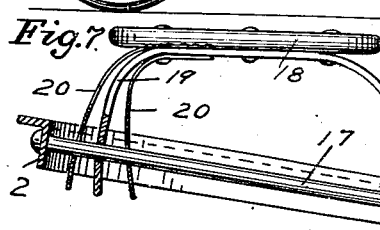
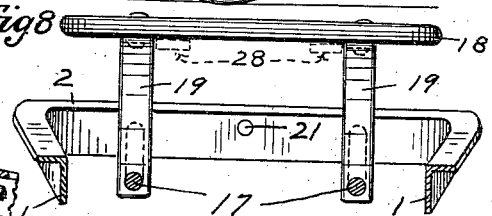
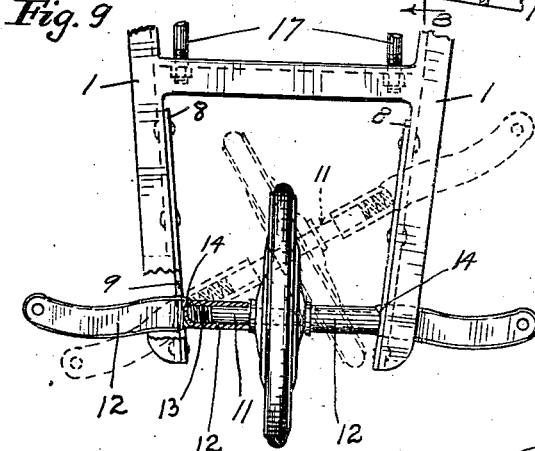
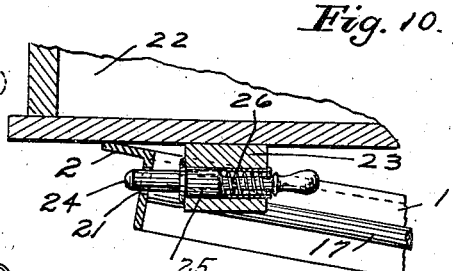
Inventor
LEWIS H. STARNES
By his Attorney
James F. Williamson May 6, 1924.

L. H. STARNES 1,493,291

CHILD'S VEHICLE

Filed Oct. 14, 1922  3 Sheets-Sheet 3

Inventor
LEWIS H. STARNES
By his Attorney
James F. Williamson

Patented May 6, 1924.

1,493,291

UNITED STATES PATENT OFFICE.

LEWIS H. STARNES, OF MINNEAPOLIS, MINNESOTA.

CHILD'S VEHICLE.

Application filed October 14, 1922. Serial No. 594,443.

*To all whom it may concern:*

Be it known that I, LEWIS H. STARNES, a citizen of the United States, residing at Minneapolis, in the county of Hennepin and State of Minnesota, have invented certain new and useful Improvements in Children's Vehicles; and I do hereby declare the following to be a full, clear, and exact description of the invention, such as will enable others skilled in the art to which it appertains to make and use the same.

This invention relates to a vehicle, and particularly to the type of vehicle used as a coaster wagon or toy cart for children. Such vehicles are now commonly used and are subjected to heavy usage as they are usually operated by boys who generally run them over sidewalk curbing and other obstacles, thus subjecting them to severe strain. A great objection to such vehicles, as previously constructed, has been a lack of durable qualities.

It is an object of this invention, therefore, to provide a vehicle which may be used either as a skeleton cart or as a box body coaster wagon and one which is simply and very strongly and ruggedly made.

It is a further object of the invention to provide such a vehicle having the usual pair of rear wheels and axle and having a front axle which is longitudinally slidable in the frame.

It is still another object of the invention to provide such a vehicle having a strong and light frame which slopes downwardly from its rear end and has mounted thereon a longitudinally movable seat adapted to be held in various positions longitudinally of the frame.

It is still another object of the invention to provide such a vehicle with said frame and seat which may also be equipped with a body adapted to be detachably connected to the frame and to be supported at its forward end by said seat, the seat forming the front bolster.

It is also a further object of the invention to provide a frame having spaced forward portions with longitudinally extending horizontal slots therein and a wheel disposed between said portions and having axial means projecting through said slots, said means having members thereon sliding in contact with the inner sides of said frame portion.

These and other objects and advantages of the invention will be fully set forth in the following description made in connection with the accompanying drawings, in which like reference characters refer to the same parts throughout the different views, and in which—

Fig. 1 is a view in side elevation of the complete vehicle;

Fig. 2 is a view in side elevation of the same with the handle and body removed, said figure showing an occupant in the vehicle and one means of propelling the same;

Fig. 3 is a vertical section taken on the line 3—3 of Fig. 2, as indicated by the arrows;

Fig. 4 is a plan view of the vehicle with the body portion removed;

Fig. 5 is a view in vertical section on the line 5—5 of Fig. 4, as indicated by the arrows and shown on an enlarged scale;

Fig. 6 is a view in side elevation of the vehicle with the body removed and the handle attached;

Fig. 7 is a vertical section taken substantially on the line 7—7 of Fig. 4;

Fig. 8 is a horizontal section taken on the line 8—8 of Fig. 7, as indicated by the arrows;

Fig. 9 is a partial plan view of the forward portion of the vehicle showing the front wheel and axle in a different position in dotted lines;

Fig. 10 is a vertical section through the rear of the body and frame of the vehicle, Figures 7 to 10 being shown on an enlarged scale;

Figure 11:
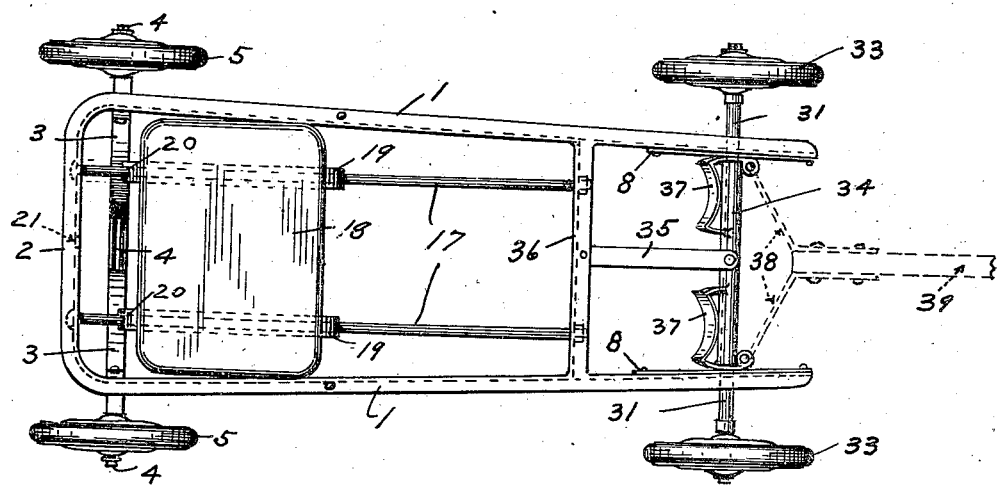
Fig. 11 is a plan view of a modified form of vehicle.

Referring to the drawings, the vehicle comprises a frame member illustrated as made from structural angle iron, which frame has spaced side members 1 converging toward their forward ends. Said side members are spaced at their forward portions but are connected by a cross-piece preferably integral therewith some distance in the rear of said forward ends and the side members are curved at their rear ends and continuous with a rear cross member 2. The said frame is supported at its rear end upon a bolster member formed of a strip 3 bent into double triangular shape, the lower portion of which is apertured to receive and bear upon the rear axle 4 having journaled thereon at its ends, the rear wheels 5. As shown in Fig. 3, the strip 3 is folded at the upper portions of its triangular ends and such folded portions are riveted to the vertical flange of the frame. Brace members 6 also formed of narrow strips have their lower ends bent around the axle 4 and extend upwardly and forwardly and have their forward upper ends riveted to the horizontal flange of the frame. The frame is thus rigidly and securely connected to the rear axle and said frame slopes downwadly toward its forward end from said rear axle. Spaced front portions of the member 1 have secured thereto by rivets, or otherwise, plates 8 which extend downwardly therefrom and are provided with longitudinally extending horizontal slots 9. A front wheel 10 is disposed between the members 1 and is journaled upon and transversely fixed to an axle 11 which extends at each side thereof. The ends of this axle are received in the hollow ends of members 12, which members are flattened to extend outwardly through the slots 9. Springs 13 are disposed in the members 12 and contact the outer ends of the axle 11 and said members 12 have formed thereon curved shoulders 14 adapted to contact the inner side of the plates 8. The shoulders 14 will be continuously held against the plates 8 by the pressure of springs 13, when the members 12 and axle 11 are swung to different positions. The outer ends of the members 12 are curved somewhat rearwardly and are adapted to form foot rests and these members are also apertured at their outer ends to receive the ends of a handle bail or yoke 15 suitably bolted to a forwardly extending handle or tongue member 16. The frame has secured therein, longitudinally extending rods 17 and a seat member 18 is provided of substantially rectangular-shape having curved and downwardly extending supports 19 provided with apertures adjacent their lower ends through which the bars 17 pass. Supports 19 are formed by a continuous curved bar and said supports have secured at each side of their rear portions, spring members 20, which also extend downwardly from the seat and are provided with somewhat elongated apertures through which the bars 17 also pass. The spring members 20 tend to spring away from the supports 19 and thus frictionally grip the rod 17 to hold the seat 18 and supports 19 in fixed position on said rods.

The rear cross member 2 of the frame has therein an aperture 21. A box or other type of body 22 is provided and has a block 23 secured centrally of its underside adjacent its rear end in which a longitudinally movable plunger 24 is disposed. This plunger is carried in a bushing 25 secured in block 23 and a coiled spring 26 normally urges the plunger to its rearwardly projecting position, as shown in Fig. 1. The said plunger is formed as a handle at its forward end and can be moved lengthwise against the pressure of spring 26. Said plunger is adapted to fit in the aperture 21 of the frame member 2 and thus detachably connects said body to the frame. The body also has a transverse strip 27 secured to its underside adapted to fit along the rear side of the seat 18 to prevent any forward motion of the body and said body also has secured to its underside adjacent its forward end downwardly offset strips 28 adapted to be disposed at the inner sides of the supports 19 and in contact therewith, as indicated by the dotted lines in Fig. 8. These members 28 also project under the edge of the seat 18. The body is thus firmly and securely attached to the frame of the vehicle and is prevented from moving either longitudinally or transversely thereof.

In operation, the vehicle may be used as an ordinary box body wagon or coaster wagon in the condition shown in Fig. 1. The same can either be drawn by the handle tongue 16 and guided thereby or the same can be guided by the feet being placed against the ends of the members 12, as shown in Fig. 2. The device can also be used as a one-seat cart by removing the body 22 which can be easily and quickly removed. By moving the spring members 20 together, the apertures therein aline with the apertures in the supports 19 and the seat 18 can then be adjusted longitudinally of the bar 17 to a position suitable to the size of the occupant. As stated, the springs 20, when released, bind upon the bars 17 and hold the seat in the position desired. The vehicle thus constructed can be used either with the tongue handle 16, as shown in Fig. 6, or this handle may be removed and the vehicle used as a coaster and guided by the feet of the occupant in engagement with the members 12. When so arranged, the vehicle can also be propelled by means of a push stick 30, as shown in Fig. 2, the open frame facilitating the operation of such a propelling member.

When the vehicle is guided laterally, the wheel 10 and members 11 and 12 are moved in the slots 8, as illustrated in Fig. 9. At this time, the springs 13 move the members 12 to keep the shoulders 14 in contact with the sides of the plates 8. The said springs 13 are compressed almost to their full extent when the wheel 10 is in its central position. By pressing upon either of the members 12 the occupant can thus easily and conveniently guide the vehicle. The said vehicle is thus adapted for a variety of uses and is easily and quickly convertible from on form to another.

Figure 12:
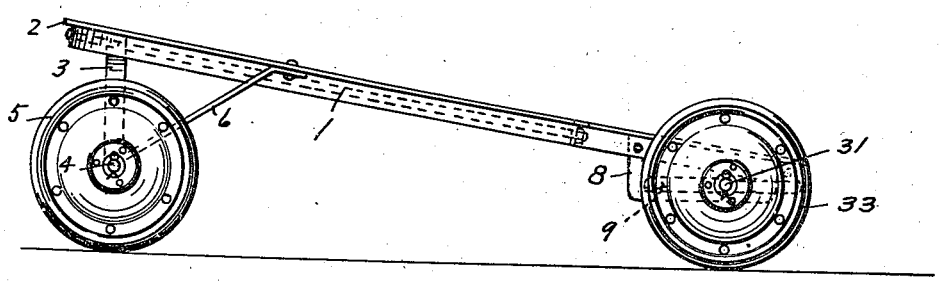
Fig. 12 is a view in side elevation thereof.

In the modification shown in Figs. 11 and 12, the structure is the same as heretofore described, except that an axle 31 is used extending through the slots in plates 8, which axle has journaled at each end thereof and secured thereon a pair of wheels 33. A sleeve 34 surrounds the axle 31 between the ends of the frame members 1, which sleeve is pivotally connected at its central portion to a link 35 which is, in turn, pivoted at its rear end to the center of the cross piece 36 connecting the frames 1. The sleeve has secured thereto, members 37 concavely curved at their rear portions to form foot rests and extending in front of the sleeve at each end thereof where they are apertured to receive connecting bolts for a handle yoke 38 bolted to a handle or tongue member 39. This structure having the two front wheels can be, of course, used with the body or without the same and can also be used with or without the handle tongue. The axle 31 slides in the slots 9 and plates 8 and the vehicle can be guided by so moving the axle by the feet of the occupant.

From the above description it is seen that applicant has provided an extremely simple and yet a very strong and rugged vehicle and one which can be quickly and easily converted to form different types of vehicle. By having the frame inclined downwardly to the front axle, a much more convenient position is secured for the occupant when sitting upon the seat 18 and guiding the vehicle by his feet. This downward inclination of the frame also makes it possible to conveniently use the seat for the front bolster and to thus firmly and securely support the vehicle body. The parts of the vehicle are made preferably from standard metal material and the same can be constructed at low cost. The device has proven very successful and efficient in actual practice and forms a great advance in the art.

It will, of course, be understood, that various changes may be made in the form, details, arrangement and proportions of the parts without departing from the scope of applicant's invention, which, generally stated, consists in the matter shown and described and set forth in the appended claims.

What is claimed is:

1. A vehicle of the class described comprising a downwardly extending frame, a running gear upon which the frame is supported, a detachable body connected to said frame, and a seat connected to said frame forming one support for the body when the body is attached and serving as a seat when the body is detached.

2. A vehicle of the class described, comprising a downwardly extending frame, a running gear upon which the frame is supported, a detachable body connected to said frame, and a seat slidably connected to said frame and forming one support for the body when the body is attached or an adjustable seat when the body is detached.

3. A vehicle of the class described, having in combination, a pair of rear wheels and a rear axle, a frame extending downwardly and forwardly therefrom having spaced forward portions provided with aligned horizontal slots, a wheel disposed between said spaced forward portions and having axial steering means projecting through said slots and forming foot rests, and a seat movable to different positions longitudinally of said frame to bring the operator's feet into proper relation to the foot rests.

4. A vehicle of the class described having in combination, a running gear, a frame supported thereon, a body detachably connected at its rear end to the rear end of said frame, and a seat slidable longitudinally on said frame and forming the front bolster for supporting said body.

5. The structure set forth in claim 6, said body carrying means adjacent said seat to prevent forward or lateral motion of said body relative thereto.

6. A vehicle of the class described comprising a frame having longitudinally extending spaced bars, a seat having spaced supports having apertures adjacent their lower ends through which said bars extend, and spring members at each side of one of said supports having apertures through which said bars extend, said spring members being adapted to spring away from said support to frictionally grip said bars to hold the seat in fixed position.

7. A vehicle of the class described having in combination, a frame having spaced front portions with horizontal longitudinally extending slots therein, a wheel disposed between said portions, an axle projecting from each side of said wheel, hollow members fitting over the ends of said axle and projecting through said slots, springs in said hollow members contacting the ends of said axle, and means on said hollow members engaging the inner sides of said frame portion.

8. A vehicle of the class described, having in combination, a frame with spaced arms at its forward end provided with horizontal slots, a front wheel and axle disposed between said arms, sleeves extending through said slots and engaging the ends of the front axle, said sleeves having shoulders formed adjacent the inner sides of said arms, and springs acting between the axle ends and the sleeves to hold the shoulders against the arms and properly space the wheel therefrom.

In testimony whereof I affix my signature.

LEWIS H. STARNES.